(No Model.)
C. C. TRINKLE, M. PETITT & E. E. COATS.
PLOW ATTACHMENT.
No. 344,795. Patented June 29, 1886.
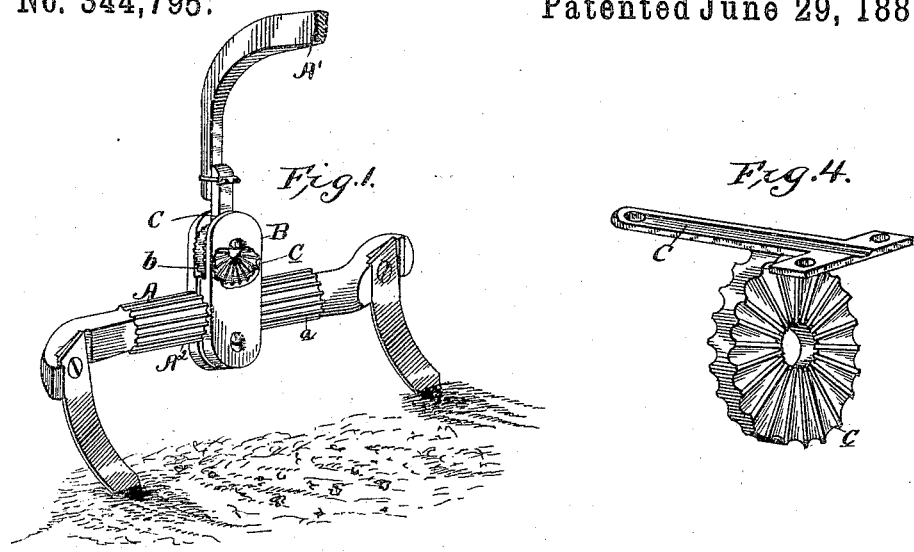
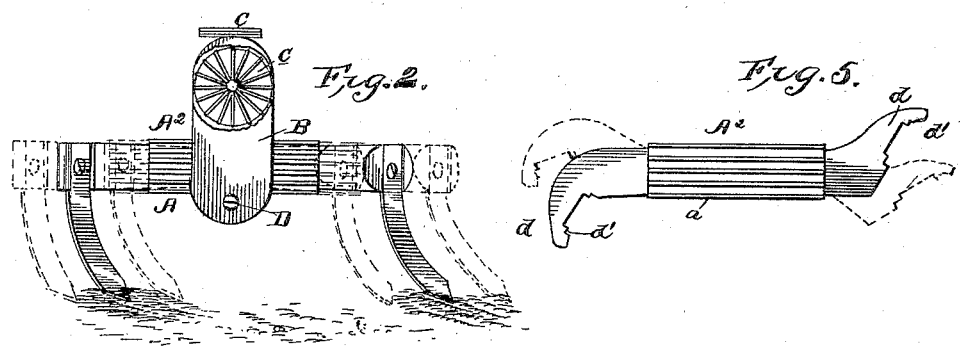
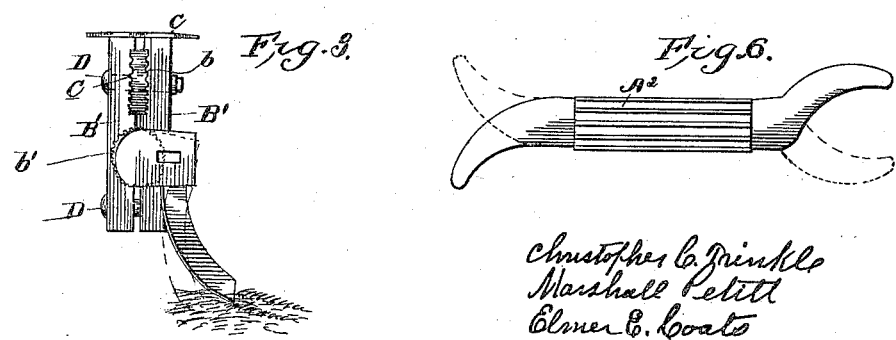
Witnesses:
R. C. Laurie
Sarepta Specht
Christopher C. Trinkle
Marshall Petitt
Elmer E. Coats
Inventors
By R. S. & A. P. Lacey
Atty's
N. PETERS, Photo-Lithographer, Washington, D. C.

UNITED STATES PATENT OFFICE.

CHRISTOPHER C. TRINKLE, MARSHALL PETITT, AND ELMER E. COATS, OF VEEDERSBURG, INDIANA.

PLOW ATTACHMENT.

SPECIFICATION forming part of Letters Patent No. 344,795, dated June 29, 1886.

Application filed April 19, 1886. Serial No. 199,285. (No model.)

*To all whom it may concern:*

Be it known that we, CHRISTOPHER C. TRINKLE, MARSHALL PETITT, and ELMER E. COATS, citizens of the United States, residing at Veedersburg, in the county of Fountain and State of Indiana, have invented certain new and useful Improvements in Corn-Plow Attachments; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for its object to provide an attachment which may be used in corn-plows, two-horse cultivators, double or single shovel-plows, or on any other of the ordinary plows.

It consists in the peculiar construction and combination of parts hereinafter fully described, and specifically pointed out in the claims.

In the drawings, Figure 1 is a perspective, parts broken away, showing the device attached to a plow-standard. Fig. 2 is a front view showing a modified form of shank. Fig. 3 is an end view showing the shovel-bar in an adjusted position by dotted lines. Fig. 4 is a perspective view of the shank and ratchet. Figs. 5 and 6 are enlarged plan views of modified forms of shovel-bars.

For the sake of illustration, the attachment is shown applied to the end of a plow-beam, A'; but in practice it is designed to be attached to plow and cultivator standards.

The attachment comprises a clip, B, ratchet-shank C, and the shovel-supporting bar A. The clip is composed of two plates, B', united at each end by bolts D. One end of this clip is provided with a mortise, $b$, between its meeting faces, which may be formed by cutting away a portion of one or both of the plates. Within this mortise extends a circular ratchet-plate, $c$, projecting from the shank C, either from the end, as shown in Fig. 1, or from the side, as shown in Figs. 2, 3, and 4. The ratchet is centrally apertured to permit the passage of the bolt D, and the teeth extend radially from said opening, and may be on one or both sides of the ratchet, as desired. The faces of the meeting parts of the clip adjacent the ratchet will be provided with corresponding teeth, to interlock therewith and form a positive connection. A semicircular groove or recess is formed in each meeting face of the parts of the clip directly opposite each other, so that when the parts are put together a circular opening, $b'$, will extend transversely through the clip from side to side and be located intermediate the bolts D.

The shovel-bar A may be of any desired length, and midway its ends it is provided with a circular portion, $A^2$, of a diameter corresponding with the opening $b'$, through the clip within which it is seated and held by the binding action of the clip. To render the binding more positive, the rounded portion is serrated or provided with ribs $a$, and the semicircular grooves in the plates of the clip are correspondingly serrated. The ends of the shovel-bar are bent to one side—the one to the right, the other to the left, of the bar—forming arms $d$, to which the shovels E are attached. These arms lie in the same plane and are provided with a series of vertical ribs, $d'$, arranged in pairs corresponding with the width of the shovel, which may be seated between a pair of such ribs, thereby adjusting the inclination of the shovel relative to the bar. In some cases it may be desirable to have each end of the bar provided with a right and left arm, in which case said ends are bifurcated, as shown in Figs. 5 and 6. The faces of the arms shown in Fig. 5 have the pairs of vertical ribs to effect an adjustment of the shovels, whereas those shown in Fig. 6 are formed on the arc of a circle, and the various adjustments of the shovels relative to the bar are effected by moving them bodily about said arms, either on their inner or outer faces, as found most convenient.

By the construction shown in Figs. 5 and 6, the shovels may be arranged to throw the earth toward the center of the bar outward and away from said center, or in the same direction either to the right or left. In Fig. 5 the arms curve in the same direction, but in Fig. 6 they curve in opposite directions, so that those on one end converge and those on the opposite end diverge. This construction is best adapted in cases where the shovels are designed to have their positions changed, so as to throw the dirt either to the right or left in the same direction. By modifying the curvature of the shovel-shank so as to fit either the inner or outer curvature of the arm, the various adjustments above noted may be readily made.

In practice, if it be desired to change the inclination of the bar to the draft, the same may be effected by loosening the bolt passing through that end of the clip provided with the mortise, when the clip will become disengaged from the ratchet of the shank. The adjustment being made, by tightening the bolt previously loosened the position is fixed.

The shovel bar may be adjusted longitudinally relative to the clip to bring the shovels nearer to or from the rows, and it may be rotated at its axis to regulate the inclination or depth of cut of the shovels. The shovels have a further adjustment on the arms of the bolt independent of the adjustment of the clip and bar.

Having thus described our invention, what we claim, and desire to secure by Letters Patent, is—

1. The combination, with the shank having a ratchet, of a clip slotted at one end for the reception of the ratchet, to which it is adjustably secured, and a shovel-bar transversely supported at the other end and provided with shovels on its opposite ends.

2. The combination, with the clip, of a shovel-bar having arms branching therefrom at an inclination held transversely therein and adjustable about its axis, and shovels secured to said arms, substantially as and for the purpose set forth.

3. The combination, with the clip, of a shovel bar provided with shovels held transversely within the clip and adjustable laterally relative thereto, substantially as set forth.

4. The combination, with the clip, of a shovel-bar held therein and adjustable laterally and about its axis, and provided with shovels on its outer ends, substantially as set forth.

5. The combination, with the shovel-bar having arms branching from its ends at an inclination, of shovels secured to said arms and bodily adjustable about said arms, for regulating their inclination to the bar, substantially as and for the purpose set forth.

6. The combination of the shank, the clip adjustably connected therewith, the shovel-bar transversely secured within said clip and having a longitudinal and rotary adjustment, arms projecting from the ends of the bar, and shovels adjustably connected with said arms, substantially as described.

In testimony whereof we affix our signatures in presence of two witnesses.

CHRISTOPHER C. TRINKLE.
MARSHALL PETITT.
ELMER E. COATS.

Witnesses:
WILLIAM E. BAKER,
C. D. RICHARDSON.